Patented Feb. 3, 1925.

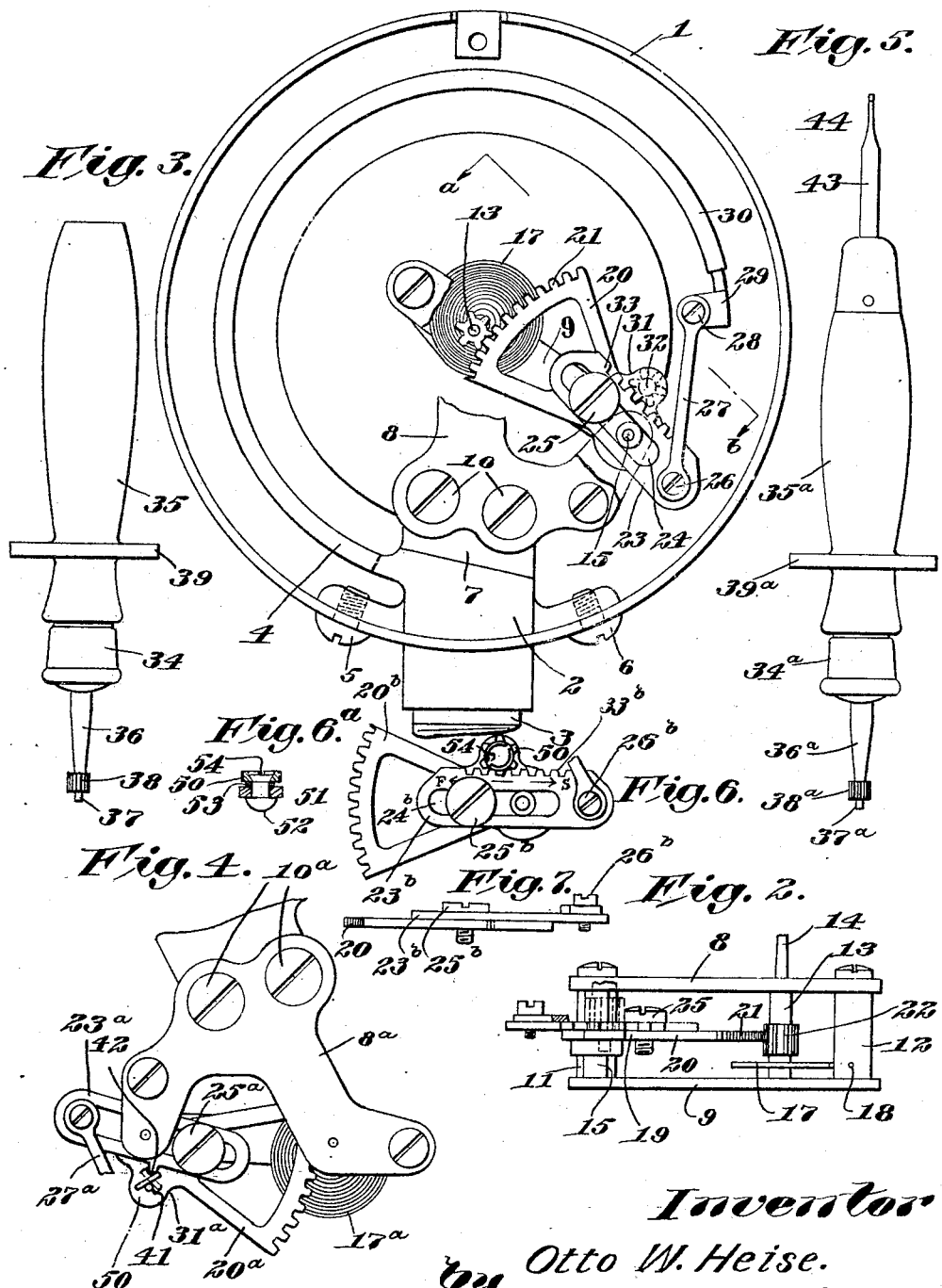

1,525,128

UNITED STATES PATENT OFFICE.

OTTO W. HEISE, OF BRIDGEPORT, CONNECTICUT, ASSIGNOR TO MANNING, MAXWELL & MOORE, INC., OF NEW YORK, N. Y., A CORPORATION OF NEW JERSEY.

GAUGE-ADJUSTING MEANS.

Application filed June 6, 1921. Serial No. 475,237.

*To all whom it may concern:*

Be it known that I, OTTO W. HEISE, a citizen of the United States of America, and resident of Bridgeport, in the county of Fairfield and State of Connecticut, have invented new and useful Improvements in Gauge-Adjusting Means, of which the following is a specification.

This invention relates to pressure gauges and more particularly to means for adjusting the same.

Pressure gauges, especially those of the Bourdon type, employ intermediate mechanism between the pressure tube and the needle or indicator for multiplying the motion of the pressure tube whereby to provide an observable movement of the needle, and also to permit of the employment of a dial having uniformly spaced graduations. As it is obviously impractical to manufacture all the parts of the gauge, and especially the Bourdon tube, with absolute accuracy and uniformity, it becomes necessary, in the assembling of the completed gauge to make certain adjustments in the parts intermediate the pressure tube and the indicating needle in order to provide for the accurate movement of the latter over the dial in accordance with variations in the pressure to which the tube is subjected. Such adjustment is also necessitated from time to time during the life of the gauge by reason of the wear of the parts and the gradual change in sensitiveness of the Bourdon tube to pressure and in accordance with federal statute all gauges used upon locomotives must be so adjusted and tested every three months. As commonly constructed, this adjustment is provided for by forming one of the levers, included in the intermediate mechanism, with an arm of variable length, such arm consisting of a relatively fixed member and a movable member slidable longitudinally thereof. After the completion of the gauge, the adjuster mounts it upon a pressure pipe and compares its readings at various parts of the dial with those of a master gauge. He then adjusts the movable part of the lever backwardly and forwardly until the desired degree of accuracy is attained. As ordinarily performed, this adjustment of the movable part of the lever is obtained by inserting a screw driver between such movable member and a fixed element of the frame and pressing against the movable part until it has been moved to the desired extent. As such movement, to secure the desired accuracy, is of the order of a thousandth of an inch, it is obvious that the operator must exercise the greatest of care and be highly skilled before he can hope to attain the desired results with any degree of speed. Not only is great care requisite on the part of the operator, but the strain on his eyesight is necessarily severe, often resulting in serious and permanent injury thereto.

As the movable part of the lever member is normally fixedly secured to the main part of the lever by a set screw, it frequently happens that the operator fails to loosen such screw to a sufficient extent before attempting to adjust the movable part of the lever. Under such circumstances, if he brings enough pressure to bear upon the movable part to adjust it, the staff upon which the lever is mounted may be bent to such an extent as to impede the free movement of the gauge parts, making the gauge defective and unmarketable.

The principal object of the present invention is to overcome the above defects and difficulties commonly experienced in the adjusting of pressure gauges, and to this end it is proposed to provide the movable and fixed parts of the lever with elements simultaneously engageable with a suitable implement whereby such parts may be accurately and rapidly adjusted without especial skill on the part of the operator and without danger of bending or otherwise damaging associated parts. As a preferred embodiment of means for carrying into effect the object of this invention, the arrangement illustrated in the accompanying drawings may be employed and in which:—

Fig. 1 is a front elevation of a gauge device with the dial plate and index needle removed in order to show the interior construction;

Fig. 2 is a fragmentary cross section taken on a line such as *a—b* of Fig. 1;

Fig. 3 is an elevational view of a tool or key useful in the adjusting of the gauge parts illustrated in Fig. 1;

Fig. 4 is a fragmentary elevation to a larger scale illustrating a modification of the device shown in Fig. 1;

Fig. 5 is an elevational view of a modified type of tool useful in adjusting the gauge parts;

Fig. 6 is a plan view of a modified arrangement of slide-adjusting mechanism;

Fig. 6ᵃ is a cross sectional detail showing an adjusting pinion employed in the device of Fig. 6; and Fig. 7 is a side elevation of the arrangement shown in Fig. 6.

Referring to Figs. 1 and 2, a gauge casing 1 of usual form is illustrated, such gauge casing having mounted at its lower portion a supporting bracket 2. This bracket extends downwardly through an opening in the casing and is provided with an externally threaded nipple whereby the gauge may be attached to a pressure pipe. Extending outwardly from bracket 2 and supported thereby is a curved pressure or Bourdon tube of well known form and construction, such tube normally lying substantially concentric with the inner wall of the casing. The bracket may be secured to the casing as by means of screws 5 and 6 and has mounted thereon, or formed integrally therewith, a supporting member 7.

Secured to the supporting member 7, as by means of screws 10, is the front plate 8 of a movement supporting frame, the rear plate of which is indicated at 9. For properly spacing and connecting the plates 8 and 9 a pair of posts 11, 12 are provided. An index staff 13 is rotatably mounted in bearing openings in the plates 8 and 9 and is provided with a forward extension 14 to which the index needle may be secured. A second staff 15 is also mounted to rotate in openings in the front and rear plates and serves for the support of a lever hereinafter described. At 17 is indicated a hair spring surrounding the staff 13 and having one end secured thereto, the opposite end of such spring being fixed within an opening at 18 in the posts 12.

Fixed upon the staff 15 is a lever 19 comprising a segmental member 20 having gear teeth 21 formed upon its arcuate edge. Such gear teeth mesh with a pinion 22 fast upon the index staff 13 whereby oscillation of the lever serves to rotate the staff 13. The lever 19 is provided with a slidable extension member 23 mounted thereon and having a longitudinal slot 24 within which the staff 15 is positioned, such staff thus serving as a guide for such slide member. 25 is a set screw passing through slot 24 and engaging a threaded opening in the main part of the lever 19, such set screw serving to adjustably secure the slide member 23 in desired position relative to the main portion of the lever. To the outer end of the slide 23 there is pivoted, at 26, one end of a link 27, the other end of said link being pivoted, as by means of a screw 28, to a bracket arm 29 fixedly mounted upon the free extremity 30 of the Bourdon tube 4. The parts as hereinbefore described are of substantially usual construction and operate in a manner well known in the art.

In accordance with the present invention, the lever 19 is provided with an outwardly extending ear 31 having a central opening 32 therethrough. The adjacent edge of the slide member 23 is provided with a plurality of gear teeth 33 forming a rack.

Referring to Fig. 3, an operating or adjusting tool or key is indicated at 34, such tool comprising a handle 35 and a shaft 36 secured in the end of the same. The shaft 36 terminates in a portion 37 of a diameter to turn freely within the opening 32 above described, and at a point adjacent, but somewhat removed from the extremity of the shaft 36 there is secured thereon a pinion 38, this pinion being of a pitch diameter such that when the member 37 is inserted within the opening 32, the pinion 38 operatively engages the rack teeth 33. The tool 34 is preferably provided with a disk 39 for engagement by the fingers or hand of the operator. Such disk serves, by the sense of touch, to inform the operator as to the amount of angular movement imparted to the tool, and while it is preferred to use a complete disk, it is contemplated that a segmental member might be employed for the desired purpose, or that a single radially extending index finger might be utilized in the same manner.

In the use of the device thus described, the gauge adjuster, having mounted the gauge upon a suitable pressure tube provided with a master gauge, observes the movement of the needle of the gauge to be tested, under variations of pressure. If it be found that the index needle fails accurately to follow that of the master gauge, the operator will insert the end 37 of the tool 34 in the opening 32, having first loosened the set screw 25, and by rotating the tool in one or the other direction, as experience indicates to be proper, causes the slide 23 to move longitudinally relative to the main portion of the lever. By the use of the rotatable tool, the operator is able to secure great nicety of the adjustment of the slide member, even though the amplitude of the adjustment is in the order of .001 of an inch. Such accuracy of adjustment is facilitated by the employment of the disk 39 upon the tool, although it is possible to dispense with such device, the operator rapidly acquiring skill in the employment of the tool to such extent as to permit him to predetermine very accurately the degree of rotation of the tool or key necessary to secure the desired result. Not only does the employment of this arrangement allow an accurate adjustment of the slide without loss of time, but it also serves to eliminate any probability of the bending of the lever staff by reason of pressure which the operator may exert in making the adjustment. This is due to the fact that the force applied reacts between the slide and an element of the main lever, and has no effect whatever upon other parts of the mechanism. Thus a common source of defective operation of completed gauges is very largely eliminated while at the same time the rapidity of adjustment is very much increased.

If desired, the slide member 23 may be provided with marks such as the letters F, S, at opposite ends, and with arrow points, if desired, indicating the proper direction of movement of the slide for securing a faster or slower movement of the indicating needle.

Referring to the arrangement shown in Fig. 4, the front plate of the supporting frame is indicated at 8a, such plate being secured in position by means of the screws 10a. The hair spring is indicated at 17a, the segmental portion of the lever at 20a, the slide member at 23a, the set screw at 25a and the connecting link at 27a, these parts being substantially like those previously described. In this arrangement, however, the slide member is provided with a single projecting tooth or lug 42 and the ear 31a projecting from the lever is provided with a lug or pin 40. In the adjustment of the slide, in accordance with this arrangement, the blade of a screw driver, indicated at 50, is placed against pin 40, with its edge in contact with one or the other side of the lug 42. By rotation of the screw driver handle the operator is thus able to move the slide in an accurate manner, it being noted, however, that with this arrangement, if the operator should move the slide to an excessive amount in one direction, he must reposition the screw driver or other tool to cause it to bear upon the other side of the lug 42, before he can readjust the slide. While this arrangement is preferable to that commonly employed, it is in some respects less desirable than the form previously described.

In Fig. 5 there is illustrated a composite tool useful in setting either type of mechanism hereinbefore described, such tool 34a comprising a handle 35a, a shaft 36a terminating in a spindle 37a and a pinion 38a mounted thereon. This handle may be provided with a disk 39a, if desired, and projecting from the opposite end of the handle there is provided a shank 43 terminating in a screw driver blade 44. Not only are the opposite ends of this tool useful in adjusting the types of mechanism illustrated in Figs. 1 and 4 respectively, but it is also useful in connection with either arrangement by reason of the fact that the screw driver blade 44 may be employed in either case for adjusting the set screw whereby the slide is fixed in position.

The arrangement illustrated in Figs. 6, 6a and 7 comprises a sector 20b having mounted thereon a slide arm 23b having a longitudinal slot 24b. Engaging the slot is a set screw 25b for holding the arm in adjusted position. The slide is provided at one edge with rack teeth 33b with which engage the teeth of a pinion 50 mounted upon a rivet 51 which passes through an opening in the sector 20b and is headed over upon the under side of the latter as indicated at 52. Between the pinion 50 and the upper face of the sector 20b there may be interposed a washer 53, if desired. A transverse slot 54 extends across the upper surface of the pinion 50. With this arrangement in adjusting the slide the set screw 25b is first loosened and then by inserting a screw driver blade into the slot 54 the pinion 50 may be rotated whereby to cause longitudinal movement of the slide 23b. This arrangement is advantageous in that it requires no special tool for the adjustment of the slide, while at the same time providing for the accurate adjustment of the latter.

While as herein disclosed in the device of Fig. 1, the rack teeth have been indicated as carried by the slide and the journal opening for the tool as provided in the fixed part of the lever, it is contemplated that this arrangement might, if desired, be reversed, and as to the arrangement of Fig. 4, it is equally clear that in place of the single lug 42, a notch might well be formed in the edge of the slide wherewith the screw driver blade might be engaged.

Having thus described the invention in a preferred embodiment of the same, together with the mode of use thereof what I claim and desire to secure by Letters Patent of the United States is:

1. A motion-transmitting lever for pressure gauge mechanisms having an arm provided with a slidable extension member, means for normally retaining said extension member in adjusted position relatively to said arm, and manually actuable means comprising a part movable about a center in a path substantially parallel to the plane of movement of said extension member and engageable with said arm and extension member respectively, whereby, upon loosening of said retaining means, said extension member may be accurately adjusted.

2. A pressure gauge having a pressure tube and an indicator, and mechanism interposed therebetween including a lever member comprising an arm having fixed and movable portions, said portions being provided respectively with elements simultaneously engageable by corresponding elements of an adjusting tool, said latter elements being rotatable in a fixed plane substantially parallel to the plane of movement of one of such portions of the arm, whereby upon actuation of said tool, said portions may be relatively moved.

3. A pressure gauge having a pressure tube and an indicator, and intermediate mechanism therebetween, said mechanism comprising a lever having an arm, an extension member slidable longitudinally of said arm, and elements carried by said arm and slidable member respectively and constructed and arranged for the interposition of a tool therebetween whereby to permit of the relative adjustment of said arm and member.

4. A motion transmitting lever for pressure gauge mechanisms having an arm provided with a slidable extension member, and a series of rack teeth carried by said extension member, said rack teeth being constructed and arranged for engagement with a manually rotatable pinion for sliding said extension member.

5. A gauge mechanism having a motion transmitting lever comprising an arm provided with a relatively slidable extension, a series of rack teeth carried by said extension, and journal means carried by said arm wherein may be rotated an element of an adjusting tool provided with gear teeth for engagement with said rack teeth.

6. A pressure gauge having a pressure actuated element and an indicating element and mechanism interposed between said elements and including a lever member, said lever member having an arm comprising relatively fixed and movable portions, the fixed portion having an opening therein and the movable portion having a plurality of spaced abutments, said opening and abutments being constructed and arranged for simultaneous engagement with an adjusting tool whereby such movable portion may be adjusted relatively to the fixed portion.

7. A gauge mechanism having a motion transmitting lever provided with an arm comprising relatively fixed and movable portions, said movable portion having a plurality of notches in its edge for engagement by an element of an adjusting tool, and abutment means carried by said fixed portion and between which and said notched portion the adjusting tool may be interposed.

8. In combination with a pressure gauge having an elongate longitudinally slidable element provided with a series of rack teeth, a tool for adjusting said element comprising a handle, a shaft extending therefrom, and a pinion fixedly secured to said shaft adjacent to the free extremity thereof, the end of the shaft extending beyond the pinion for engagement with a socket opening fixed relatively to the slide element, said pinion being constructed and arranged for cooperation with said rack teeth whereby to adjust said element.

9. In combination with a pressure gauge having a swinging sector and an adjustable slide member carried thereby provided with rack teeth along one edge, a positioning element fixed relatively to the adjustable slide member, a tool for adjusting said member comprising a handle, a shaft extending therefrom, a pinion secured to said shaft adjacent to its free extremity but spaced from the latter, the projecting end of the shaft beyond the pinion being engageable with the positioning element, said pinion being engageable with the aforesaid rack teeth whereby upon rotation of the tool the slide member is adjusted, and a disc concentric with and secured to the handle, said disc being of a diameter substantially greater than that of the handle and constituting an indicator whereby to permit accurate determination of the amount of movement of rotation manually imparted to the handle.

10. In combination with a gauge having a pressure tube and an indicator, mechanism interposed therebetween and comprising a pivotally mounted lever having a fixed arm, an extension slide adjustable relatively to said arm, said slide having a longitudinal slot, a set screw within said slot and engaging the fixed arm, rack teeth upon one edge of said slide, said arm having a journaled opening adjacent said teeth, and an adjusting tool comprising a shaft engageable with said journal opening, a pinion meshable with said rack teeth, and a handle for rotating said shaft and pinion.

11. In combination with a pressure gauge having an adjustable element provided with rack teeth, a set screw for retaining said element in adjusted position, and means for loosening and tigthening the set screw, and for engaging said rack teeth to move the adjustable element when the screw has been loosened.

Signed by me at Bridgeport, Connecticut, this 30th day of April, 1921.

OTTO W. HEISE.